US008395919B2

(12) United States Patent
Schroeder et al.

(10) Patent No.: US 8,395,919 B2
(45) Date of Patent: Mar. 12, 2013

(54) PHOTOVOLTAIC INVERTER SYSTEM AND METHOD OF STARTING SAME AT HIGH OPEN-CIRCUIT VOLTAGE

(75) Inventors: Stefan Schroeder, Munich (DE); Jie Shen, Ingolstadt (DE); Said Farouk Said El-Barbari, Freising (DE); Robert Roesner, Unterfoehring (DE)

(73) Assignee: General Electric Company, Niskayuna, NY (US)

( * ) Notice: Subject to any disclaimer, the term of this patent is extended or adjusted under 35 U.S.C. 154(b) by 238 days.

(21) Appl. No.: 12/845,802

(22) Filed: Jul. 29, 2010

(65) Prior Publication Data
US 2012/0026769 A1 Feb. 2, 2012

(51) Int. Cl.
*H02M 7/537* (2006.01)
(52) U.S. Cl. .................. 363/131; 363/132
(58) Field of Classification Search ........... 363/35, 363/43, 49, 131, 132; 323/223, 266, 299, 323/901, 906
See application file for complete search history.

(56) References Cited

U.S. PATENT DOCUMENTS

| 4,333,136 | A | * | 6/1982 | Baker | 363/43 |
| 6,058,035 | A | * | 5/2000 | Madenokouji et al. | 363/95 |
| 7,102,321 | B2 | * | 9/2006 | Edwards et al. | 318/400.26 |
| 7,502,241 | B2 | | 3/2009 | Taylor | |
| 7,619,200 | B1 | | 11/2009 | Seymour et al. | |
| 7,710,752 | B2 | | 5/2010 | West | |
| 2008/0094867 | A1 | | 4/2008 | Muller et al. | |
| 2010/0124087 | A1 | | 5/2010 | Falk | |
| 2010/0213768 | A1 | * | 8/2010 | Faveluke | 307/82 |

FOREIGN PATENT DOCUMENTS

| DE | 202006001063 U1 | 6/2006 |
| EP | 1039621 B1 | 12/2004 |

OTHER PUBLICATIONS

Xantrex Technology Inc., PV-5208, 10208, 15208, 20208 & 30208 Power Conversion System for Grid-Tied Photovoltaic Applications, Technical Description, Livermore, CA, Revised May 2001, pp. 1-10.
B. Von Roedern; G.H. Bauer, "Why is the Open-Circuit Voltage of Crystalline Si Solar Cells so Critically Dependent on Emitter-and Base-Doping?", 9th Workshop on Crystalline Silicon Solar Cell Materials and Processes, Breckenridge, Colorado, Aug. 9-11, 1999, pp. 1-4.
R. West, "Advanced, High-Reliability, System-Integrated 500-kW PV Inverter Development", National Renewable Energy Laboratory, Final Subcontract Report, Sep. 29, 2005-May 31, 2008, pp. 1-60.
English Abstract for DE202006001063 (U1), Jun. 1, 2006.

* cited by examiner

*Primary Examiner* — Bao Q Vu
*Assistant Examiner* — Yemane Mehari
(74) *Attorney, Agent, or Firm* — Ann M. Agosti

(57) ABSTRACT

A power inverter system includes a DC to AC inverter configured to convert DC voltage from a DC power source to AC voltage. A DC link couples the DC power source and the inverter. An inverter pre-charger operates to pre-charge the inverter to achieve a desired DC link voltage prior to connecting the power inverter system to an AC power grid. A phased lock loop synchronizes the pre-charged inverter to the AC power grid prior to connecting the power inverter system to the AC power grid. The pre-charged inverter regulates the DC link voltage to about the minimum voltage level that allows control of AC grid currents via the inverter subsequent to connecting the power inverter system to the AC grid. The inverter operates in a maximum power point tracking control mode only subsequent to a first voltage transient caused by connecting the DC power source to energize the power inverter system.

20 Claims, 7 Drawing Sheets

PHOTOVOLTAIC INVERTER SYSTEM AND METHOD OF STARTING SAME AT HIGH OPEN-CIRCUIT VOLTAGE

BACKGROUND

This invention relates generally to the field of solar power generation and, more particularly, to methods and systems to allow for a high DC source voltage in a solar power converter system.

Solar power generation is becoming a progressively larger source of energy throughout the world. Solar power generation systems typically include one or more photovoltaic arrays (PV arrays) having multiple interconnected solar cells that convert solar energy into DC power through the photovoltaic effect. In order to interface the output of the PV arrays to a utility grid, a power converter system is used to change the DC current and DC voltage output of the PV array into a 60/50 Hz AC current waveform that feeds power to the utility grid.

Various power converter systems exist for interfacing the DC output of a PV array (or other DC power source) with the AC grid. One implementation of a power converter system includes two stages, a boost converter stage and an inverter stage. The boost converter stage controls the flow of DC power from the PV array to a DC bus or DC link (hereinafter referred to as the "DC link"). The inverter stage converts the power supplied to the DC link into a suitable AC waveform that can be output to the AC grid.

Many situations arise in which it is necessary to accommodate a PV array (or other DC power source) that has a high open-circuit voltage, such as an open-circuit voltage of about 1000 $V_{DC}$ or more. In such situations, it is desirable to have a power converter system that operates at a PV array source voltage and a DC link voltage that is less than the open-circuit voltage of the PV array. This is primarily because power electronic devices that are used in the power converter system, such as insulated gate bipolar transistors (IGBTs), are typically selected to accommodate the maximum power voltage of the PV array, not the open-circuit voltage of the PV array.

For instance, FIG. 1 illustrates a typical voltage-current curve 10 (hereinafter referred to as a "V-I curve") for a PV array at a particular temperature and irradiance. FIG. 2 illustrates a typical power curve 20 for a PV array at a particular temperature and irradiance. The maximum power point for the PV array occurs at the current indicated by dashed line 12 in FIGS. 1 and 2. The voltage of the PV array at dashed line 12 is the maximum power voltage for the PV array. Point 14 of FIG. 1 represents the open-circuit voltage (voltage when the current is zero) of the PV array. As illustrated, the maximum power voltage of the PV array is typically less than the open-circuit voltage of the PV array.

If the power converter system operates at a PV array source voltage or DC link voltage substantially equal to or greater than the open-circuit voltage of the PV array, the power converter system would require higher rated power electronic devices. Higher rated power electronic devices are typically more expensive and have higher conduction losses, leading to reduced efficiency. Moreover, the use of power electronic devices rated for a voltage higher than the maximum power voltage results in reduced operating efficiency. Thus, there is a need to have a power converter system that operates at a PV array source voltage and a DC link voltage that is less than the open-circuit voltage of the PV array.

Once a power converter system is running in steady state conditions, the inverter can regulate the DC link voltage such that the DC link voltage is less than the PV array open-circuit voltage. However, during startup or during other transient conditions when the PV array is first coupled, decoupled, or re-coupled to the converter, the power converter system may have to temporarily accommodate an open-circuit voltage or other high source voltage of the PV array. The transient conditions may cause the DC link voltage or the PV array source voltage to go above an over-voltage trip point for the power converter system, leading to damage or to disconnection of the PV array from the power converter system.

In view of the foregoing, there is a need for a method and system to allow for a high source voltage in a power converter system during startup conditions that maintains the DC link voltage and the PV array source voltage less than the open-circuit voltage of the PV array. The method and system should avoid high collector-emitter voltage across IGBTs due to high open-circuit voltages of the PV panels.

BRIEF DESCRIPTION

One exemplary embodiment of the present disclosure is directed to a power inverter system, comprising:
a DC power source;
a DC to AC inverter configured to convert DC voltage from the DC power source to AC voltage;
a DC link coupling the DC power source and the inverter, the DC link having a DC link voltage;
an inverter pre-charger configured to pre-charge the inverter to achieve a desired DC link voltage prior to connecting the power inverter system to an AC power grid; and
a phased lock loop configured to synchronize the pre-charged inverter to the AC power grid prior to connecting the power inverter system to the AC power grid, wherein the pre-charged inverter is further configured to regulate the DC link voltage to about the minimum voltage level that allows control of AC grid currents via the inverter subsequent to connecting the power inverter system to the AC grid, and further wherein the inverter is further configured to operate in a maximum power point tracking control mode subsequent to a first voltage transient caused by connecting the DC power source to the power inverter system.

Another exemplary embodiment of the present disclosure is directed to a method of operating a power inverter system, the method comprising:
pre-charging a DC to AC inverter to achieve a desired DC link voltage that is less than a predetermined DC voltage source open circuit voltage;
synchronizing the resultant inverter output voltage to a predetermined AC power grid voltage via a phase-locked loop
connecting the synchronized inverter to the AC power grid;
activating a DC link voltage control and regulating the DC link voltage to about the minimum level that allows control of grid currents generated via the inverter; and
connecting the DC voltage source to the power inverter system subsequent to activating the DC link voltage control and regulating the DC link voltage to about the minimum level, such that the inverter adjusts power to the AC power grid to maintain a constant DC link voltage, and further such that the inverter commences maximum power point tracking control subsequent to the first DC voltage source voltage transient following connection of the DC voltage source to the power inverter system.

A further exemplary embodiment of the present disclosure is directed to a method of operating a power inverter system, the method comprising:

pre-charging a DC to AC inverter to achieve a desired DC link voltage that is less than a predetermined DC voltage source open circuit voltage;

synchronizing the resultant inverter output voltage to a predetermined AC power grid voltage via a phase-locked loop connecting the synchronized inverter to the AC power grid;

activating a DC link voltage control and regulating the DC link voltage to about the minimum level that allows control of grid currents generated via the inverter;

activating a DC-DC converter and a corresponding maximum power point (MPP) voltage control mechanism and regulating the converter input voltage to about the minimum voltage level; and connecting the DC voltage source to the power inverter system subsequent to activating the converter and regulating the converter input voltage to about the minimum level, such that the converter commences maximum power point tracking control subsequent to the first DC voltage source voltage transient following connection of the DC voltage source to the power inverter system.

DRAWINGS

These and other features, aspects, and advantages of the present invention will become better understood when the following detailed description is read with reference to the accompanying drawing, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 3:
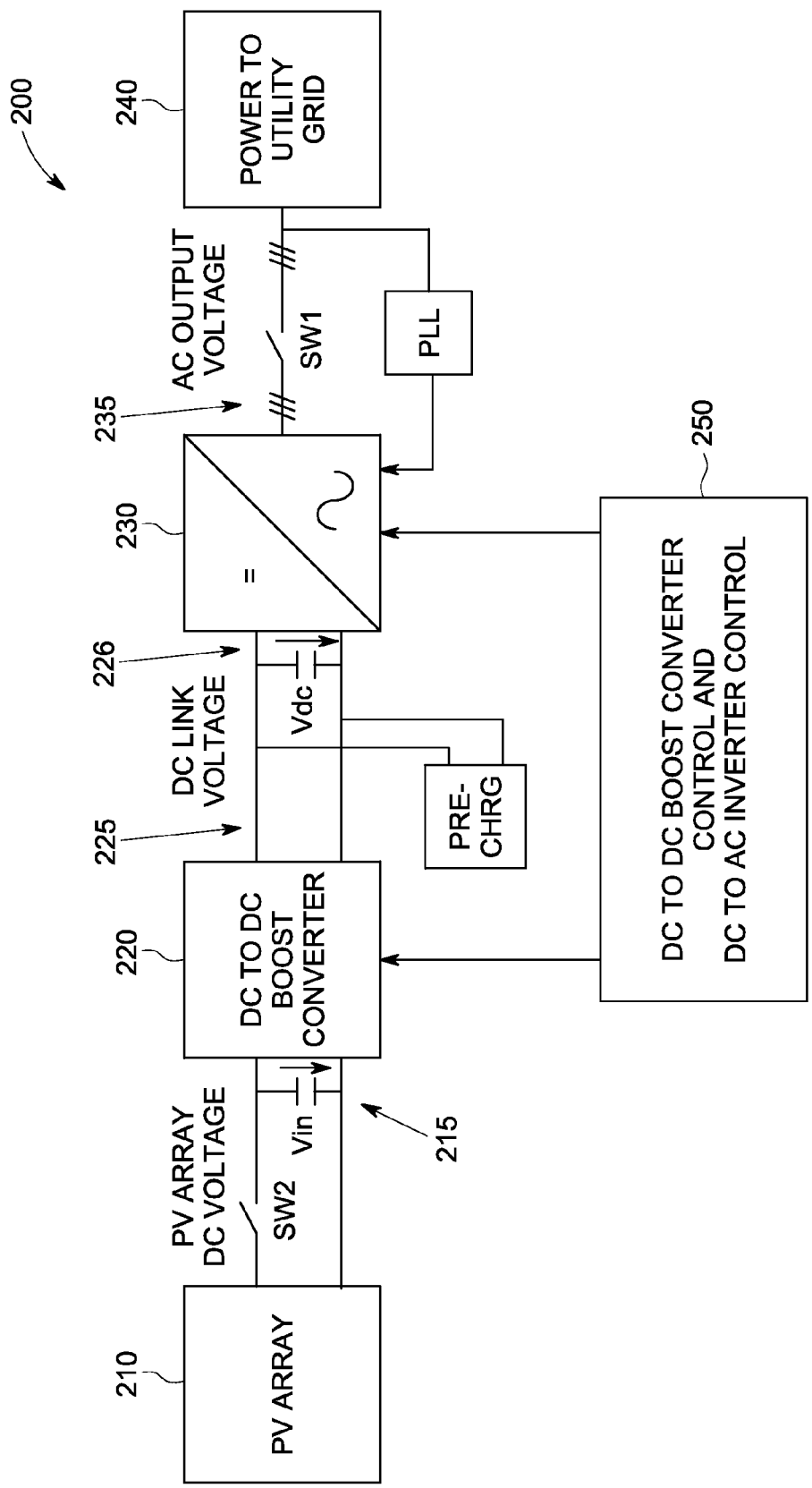
FIG. 3 is a block diagram illustrating a power system according to an exemplary embodiment of the present disclosure.

FIG. 3 depicts a block diagram of a two stage PV power converter system 200 used to convert DC power 215 generated by a PV array 210 into AC power 235 suitable for feeding an AC power grid 240. The first stage of power converter system 200 can include a DC to DC converter 220, such as a boost converter, that provides DC power 225 to a DC link 226.

The DC link 226 couples the DC to DC converter 220 to an inverter 230 which operates as the second stage of the power converter 200. Inverter 230 converts the DC power 225 on the DC link 226 to AC power 235 suitable for being supplied to an AC power grid 240. DC to DC converter 220 can be a part of or integral with inverter 230 or can be a separate stand alone structure from inverter 230. In addition, more than one converter 220 can be coupled to the same inverter 230 through one or more DC links.

Power converter system 200 includes a control system 250 that is configured to control both the DC to DC boost converter 220 and the DC to AC inverter 230. For instance, control system 250 can be configured to regulate the output of the DC to DC converter 220 pursuant to a control method that adjusts the duty cycle (switching speed) of the switching devices (IGBTs or other power electronic devices) used in the DC to DC converter 220. Control system 250 can also be configured to regulate the output of inverter 230 by varying the modulation commands provided to inverter 230. The modulation commands control the pulse width modulation of the inverter 230 and can be used to vary the real and reactive output power of the inverter 230. Control system 250 can be independent from DC to DC boost converter 220 and DC to AC inverter 230 or may be integrated into one or both of the respective power converter system stages 220, 230.

When power converter system 200 is operating in steady state conditions, control system 250 can regulate the DC link voltage 225 of the DC link 226 (and, correspondingly, the PV array source voltage of the PV array 210) by adjusting the AC output of inverter 230. For instance, control system 250 can regulate the DC link voltage 225 of the DC link 226 by controlling the AC current output of inverter 230. In steady state conditions, the inverter 230 is typically controlled to provide real power flow (i.e., the real part of the vector product of the inverter output AC voltage and the inverter output AC current) to the AC grid 240 that is equal to the power supplied to the DC link 226 by DC to DC converter 220. Varying the output AC current of the inverter 230 will result in a change to the output AC voltage of the inverter 230, based on the impedance of one or more output transformers and the utility grid 240. Adjusting the output AC voltage of the inverter 230 will correspondingly induce a change in the DC link voltage 225 of the DC link 226.

In situations in which it is necessary to accommodate a PV array 210 (or other DC power source) having a high open-circuit voltage, it is desirable to maintain the DC link voltage 225 less than the open-circuit voltage of the PV array 210. By maintaining the DC link voltage 225 less than the open-circuit voltage of the PV array 210, the PV array source voltage provided by the PV array 210 to the power converter system 200 can also be maintained less than the open-circuit voltage of the PV array 210, such as at the maximum power voltage of the PV array 210. In steady-state conditions, the control system 250 can regulate the DC link voltage 225 to be less than the open-circuit voltage of the PV array 210 by controlling the output of inverter 230.

Figure 4:
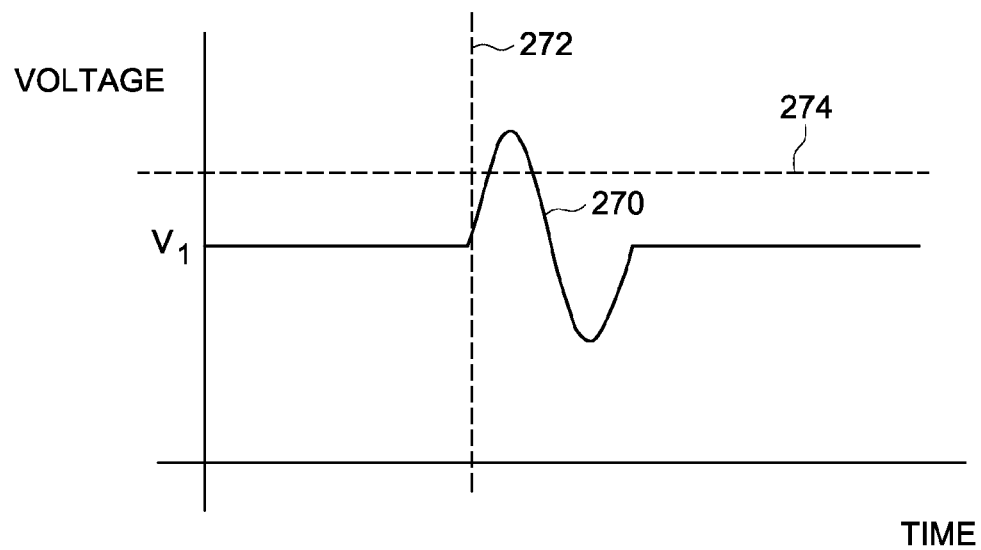
FIG. 4 is a graphical representation of DC link voltage plotted versus time for the power system depicted in FIG. 3 according to one embodiment.

During transient conditions, such as when the PV array 210 is first coupled or re-coupled to the power converter system 200, the DC link voltage may transiently move above an over-voltage trip point for the power converter system 200, leading to damage or to disconnection (through opening of a circuit breaker, contact, relay, switch, or other device) of the PV array 210 from the power converter system 200. For example, FIG. 4 is a graphical representation of a DC link voltage curve 270 plotted versus time. The DC link voltage is controlled to operate at a first voltage $V_1$. At time 272, PV array 210 having a high open-circuit voltage is coupled to the power converter system 200. As illustrated, the DC link voltage moves above an over-voltage trip point indicated by dashed line 274. This can lead to damage to the power converter system 200 or to disconnection of the PV array 210 from the power converter system 200 through opening of a circuit breaker, contact, relay, switch, or other device.

Figure 5:
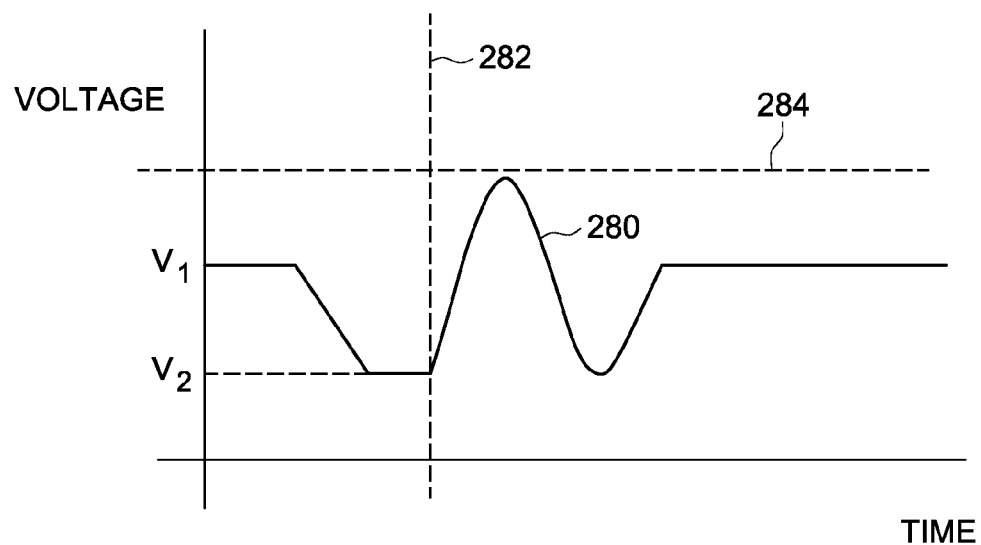
FIG. 5 is a graphical representation of DC link voltage plotted versus time for the power system depicted in FIG. 3 according to another embodiment of the present disclosure.

To address this concern, embodiments of the present disclosure temporarily adjust the DC link voltage 225 of the DC link 226 so that the DC link voltage 225 can withstand any voltage surges during transient start-up conditions. For example, as illustrated in FIG. 5, the DC link voltage represented by curve 280 is adjusted from a first voltage $V_1$ to a second voltage $V_2$. When the PV array 210 is coupled to the power converter system 200 at time 282, the DC link voltage temporarily increases. However, the DC link voltage never reaches the over-voltage trip point 284 for the power converter system 200. In this manner, the power converter system 200 can accommodate a PV array 210 with a high open-circuit voltage. In particular embodiments described in further detail herein, the DC link voltage may be temporarily lowered by pre-charging the inverter 230 prior to coupling the PV array 210 to the power converter system 200.

Figure 6:
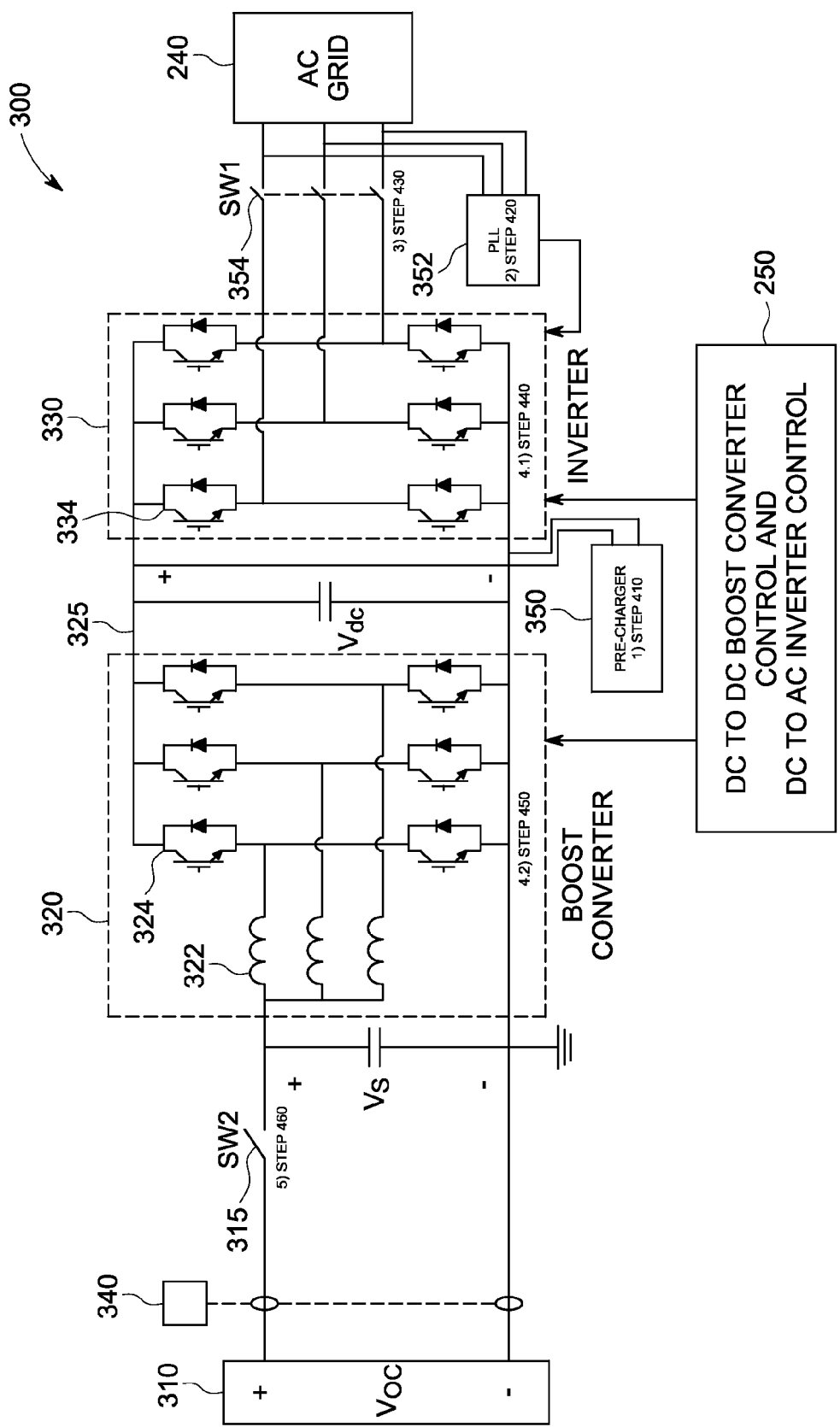
FIG. 6 is a block diagram illustrating a more detailed diagram of the power system depicted in FIG. 3.

Referring now to FIG. 6, a circuit diagram for an exemplary two stage power converter system 300 will now be discussed in detail. A PV array 310 has a plurality of interconnected solar cells that produce a DC voltage and a DC current in response to solar energy incident on the PV array 310. When no current flows from the PV array 310, the PV array 310 provides an open-circuit voltage Voc. The open-circuit voltage Voc can be greater than the voltage ratings of the power electronic devices and/or other circuit elements used in power converter system 300.

Figure 1:
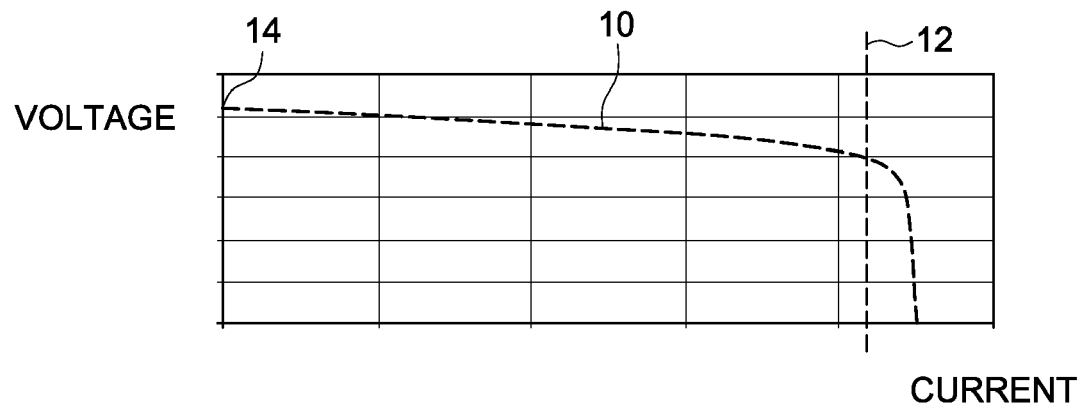
FIG. 1 is a graph illustrating an exemplary V-I curve for a PV array at a particular temperature and irradiance.
Figure 2:
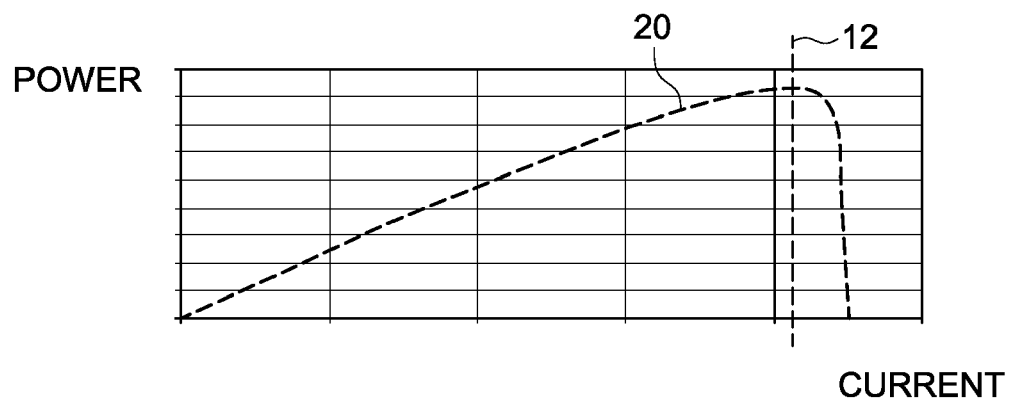
FIG. 2 is a graph illustrating an exemplary power curve for a PV array at a particular temperature and irradiance.

The PV array 310 can be coupled to power converter system 300 by a switch 315. When switch 315 is open, no current will flow from PV array 310 and the PV array will generate open-circuit voltage Voc. When switch 315 is closed, current will flow from PV array 310 to the power converter system 300. The PV array source voltage $V_s$ provided to the power converter system will vary depending on the current provided by the PV array 310. FIG. 1 illustrates a V-I curve showing the relationship between voltage and current for a typical PV array 310, as stated herein.

The PV array source voltage $V_s$ is preferably less than the open-circuit voltage Voc of the PV array 310. The PV array source voltage Vs, for example, is preferably maintained at the maximum power voltage for the PV array 310 according to one embodiment. The PV array source voltage $V_s$ can be regulated by controlling the output of boost converter 320 and/or inverter 330.

Boost converter 320 is configured to receive the DC power from PV array 310 and provide DC power to the DC link 325. Boost converter 320 boosts the PV array source voltage Vs to a higher DC link voltage VL and controls the flow of DC power onto DC link 325. While boost converter 320 illustrates one architecture depicted in FIG. 6, those of ordinary skill in the art will understand, using the disclosures provided herein, that any form of DC to DC converter configured to regulate the DC power provided to DC link 325 can be used in power system 300 without deviating from the scope of the present disclosure. DC to DC converter 320, for example, can be a boost converter, buck converter, or buck/boost converter.

Boost converter 320 includes inductive elements 322 and a plurality of switching devices 324. The switching devices 324 can include one or more power electronic devices such as IGBTs. Boost converter 320 controls the flow of DC power onto DC link 325 by regulating either the DC input current or DC input voltage to DC link 325. In particular embodiments, boost converter 320 is controlled by sending gate timing commands to the switching devices 324 used in boost converter 320.

DC link 325 couples boost converter 320 to inverter 330. DC link 325 can include one or more capacitors to provide stability. DC link 325 operates at a DC link voltage $V_L$. The control system 250 can regulate the DC link voltage $V_L$ by controlling the output of inverter 330. While the boost converter 320 is delivering power to the DC link 325, the DC link voltage $V_L$ is maintained proportional to the PV array source voltage $V_s$ according to the duty cycle of boost converter 320. A change in DC link voltage VL will correspondingly induce a change in PV array source voltage Vs. In this regard, the PV array source voltage Vs can be regulated by controlling the DC link voltage VL.

Inverter 330 converts the DC power of DC link 325 into AC power that is suitable for being fed to an AC power grid 240. Although FIG. 6 illustrates a three-phase AC output for inverter 330, those of ordinary skill in the art, using the disclosures provided herein, should readily understand that inverter 330 can similarly provide a single-phase AC output or other multi-phase AC output as desired without deviating from the scope of the present invention.

Inverter 330 uses one or more inverter bridge circuits 334 that include power devices, such as IGBTs and diodes that are used to convert the DC power on DC link 325 into a suitable AC waveform. For instance, in certain embodiments, inverter 330 uses pulse-width-modulation (PWM) to synthesize an output AC voltage at the AC grid frequency. The output of inverter 330 can be controlled by providing gate timing commands to the IGBTs of the inverter bridge circuits 334 of inverter 330 according to well known PWM control techniques. The output AC current flowing from inverter 330 has components at the PWM chopping frequency and the grid frequency.

Power converter system 300 may also include a PV array voltage sensor 340. PV array voltage sensor 340 monitors the voltage of the PV array 310 and provides feedback signals to a control system 250. The control system 250 can make adjustments to the DC link voltage or other operating parameters of power converter system 300 based on the PV array voltage detected by PV array voltage sensor 340.

Power converter system 300 may further comprise an inverter pre-charger 350 and a phased lock loop 352. During steady state conditions, the control system 250 can regulate the DC link voltage $V_L$ by adjusting the AC output of inverter 330. As will be discussed in detail herein, the control system 250 can also be configured to regulate the DC link voltage VL to absorb any voltage surges that may occur during start-up transient conditions, such as when the PV array 310 is first coupled or re-coupled to the power converter system 300. During start-up conditions for example, the control system 250 operates in combination with the inverter pre-charger 350 and the phased lock loop 352 to avoid high collector-emitter voltages across the IGBTs due to high open-circuit voltages of the PV array 310.

Figure 7:
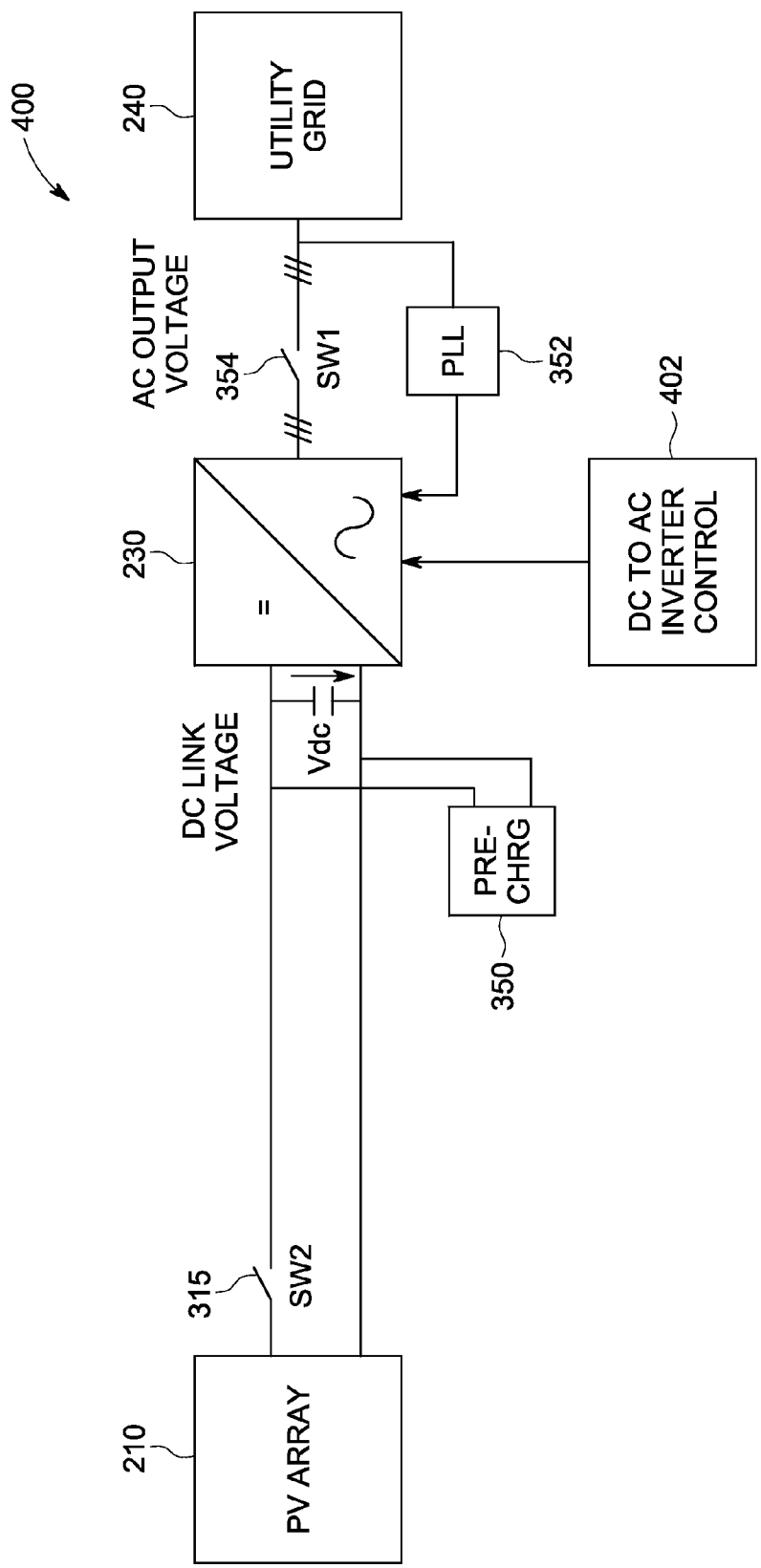
FIG. 7 is a block diagram illustrating a power system according to another embodiment.

FIG. 7 is a flow diagram illustrating a starting procedure 400 for the power converter system 300 according to one embodiment. Starting procedure 400 advantageously increases the maximum number of solar cells that can be connected to power converter system 300 during its start-up process to provide for higher energy capture and increased earnings. Many known power converter system can employ starting procedure 400 simply by introducing an advanced control algorithm that avoids any requirements for additional hardware.

With continued reference to FIG. 7, starting procedure 400 commences by pre-charging the inverter 330 so that the DC link voltage $V_L$ is equal to a first DC link voltage as represented in step 410. First DC link voltage is preferably less than the open-circuit voltage Voc of PV array 310. The control system 250 can operate DC link 325 at a first DC link voltage by controlling the AC output of inverter 330. PV array voltage sensor 340 can be used to determine if PV array 310 is operating at an open-circuit voltage or other voltage.

Subsequent to pre-charging the inverter 330, the inverter output voltage is synchronized to the AC grid voltage via the PLL 352 as represented in step 420. In one embodiment, the open-circuit voltage can be generated because the PV array 310 has not yet been coupled to the power converter system 300. For instance, switch SW2 315 can be in an open position, preventing current from flowing from the PV array 310 to the converter 320. In this situation, PV array 310 will generate an open-circuit voltage Voc.

At step 430, in anticipation of coupling or re-coupling PV array 310 to the converter 320, the synchronized inverter 330 is connected to the AC grid 240 via switch SW1 354.

Once the inverter 330 is connected to the grid 240, the control system 250 is activated to adjust the DC link voltage $V_L$ from the first DC link voltage to a second DC link voltage as represented in step 440. The second DC link voltage is preferably the minimum voltage level (Vdc,min, e.g. 600V) that still allows control of the grid currents via the inverter 330.

In one embodiment, the control system 250 can temporarily lower the DC link voltage $V_L$ from the first DC link voltage to the second DC link voltage by overmodulating the inverter 330. Overmodulating the inverter 330 includes adjusting the gate timing commands of the inverter 330 so that the peak AC voltage of the AC output of inverter 330 is greater than the DC link voltage VL. In this condition, if power flow and AC output voltage of inverter 330 remains constant, the DC link voltage VL will be reduced from the first DC link voltage to the second DC link voltage.

In another embodiment, the control system can temporarily lower the DC link voltage by inputting reactive power into the inverter 330 from the AC grid. This will also induce a temporary reduction in DC link voltage VL from the first DC link voltage to the second DC link voltage. By reducing the DC link voltage $V_L$, the power converter system 300 will be ready to withstand any voltage surges caused during transient conditions when the PV array 310 is coupled to the converter 320.

The boost converter 324 is activated simultaneously with or immediately subsequent to activation of the dc link voltage control to regulate the boost converter input voltage to about the minimum voltage level using corresponding maximum power point voltage controls as represented in step 450.

The PV array 310 can then be coupled to the power converter system 300 during start up conditions or after being decoupled from the power converter system 300 during a shut down condition or trip condition as represented in step 460. In a particular embodiment, PV array 310 can be coupled to converter system 300 by closing switch SW2 315. Subsequent to coupling the PV array 310 to converter system 300, control system 250 functions to quickly increase the power to the grid 240 in order to maintain a constant dc link voltage. By controlling the DC link voltage $V_L$ to be less than the open-circuit voltage Voc of the PV array 310, the PV array source voltage Vs is also maintained less than the open-circuit voltage Voc of the PV array 310, such as at the maximum power voltage for the PV array. In this manner, a power converter system 300 can accommodate a high open-circuit PV array 310 without having to use higher rated power electronic devices, such as higher rated IGBTs, in the power converter system 300.

Subsequent to the first/start-up transient, DC-DC converter 320 commences its normal MPP tracking control mode as represented in step 470. During this period of time, the reference DC link voltage increases to the nominal value (Vdc,nom, e.g. 750 V).

Figure 8:
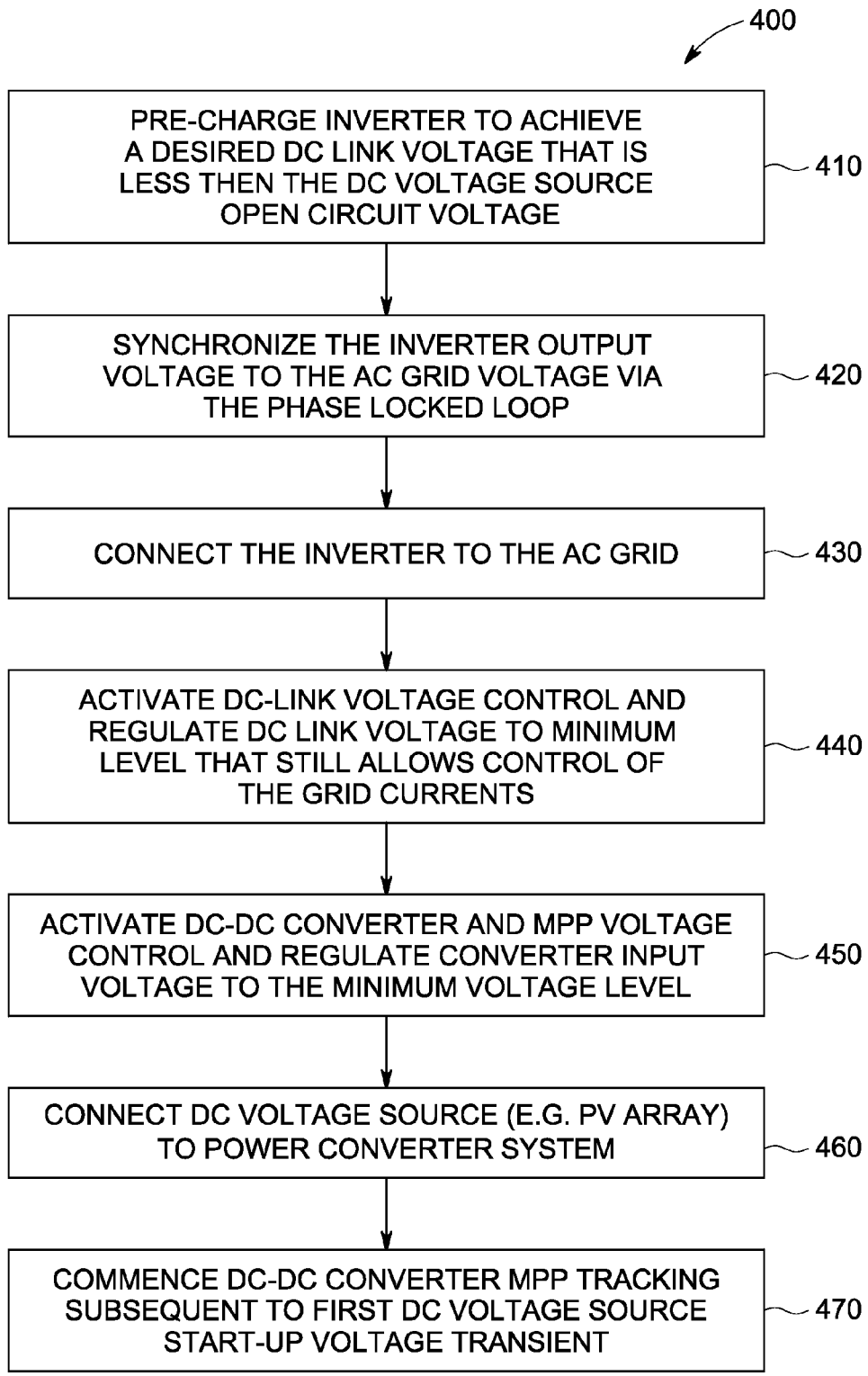
FIG. 8 is a flow diagram illustrating a method of operating the power system depicted in FIGS. 3 and 6 according to one embodiment.
Figure 9:
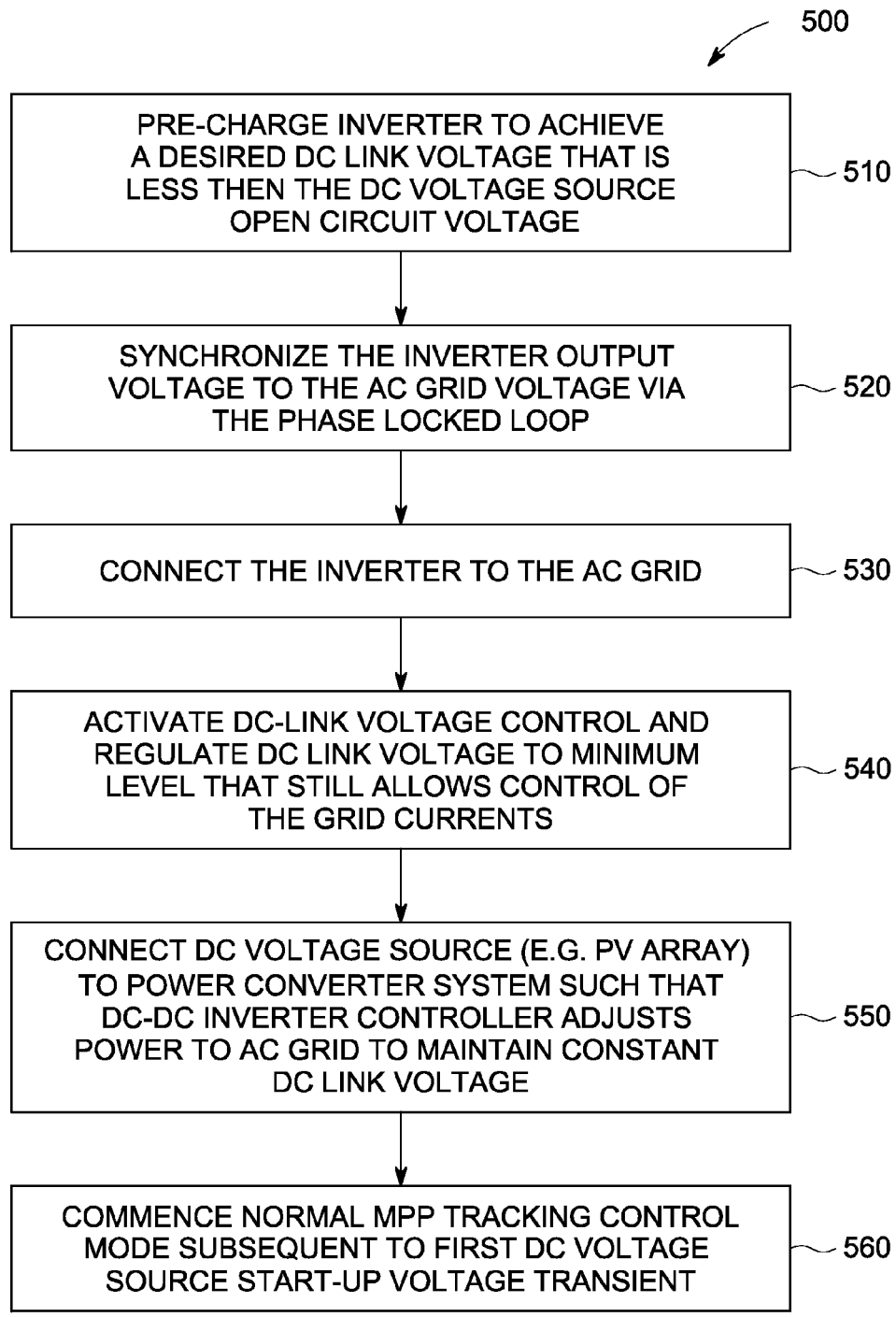
FIG. 9 is a flow diagram illustrating a method of operating the power system depicted in FIG. 7 according to one embodiment.

FIG. 8 is a flow diagram illustrating a starting procedure 500 for the power converter system 400 according to one embodiment. Starting procedure 500 advantageously increases the maximum number of solar cells that can be connected to power converter system 400 during its start-up process to provide for higher energy capture and increased earnings. Many known power converter system can employ starting procedure 500 simply by introducing an advanced control algorithm that avoids any requirements for additional hardware.

With continued reference to FIG. 8, starting procedure 500 commences by pre-charging the inverter 230 so that the DC link voltage $V_L$ is equal to a first DC link voltage that is less than the DC voltage source 210 open circuit voltage as represented in step 510. The control system 402 can operate the DC link at the first DC link voltage by controlling the AC output of inverter 230.

Subsequent to pre-charging the inverter 230, the inverter output voltage is synchronized to the AC grid voltage via the PLL 352 as represented in step 520. In one embodiment, the open-circuit voltage can be generated because the PV array 210 has not yet been coupled to the power converter system 500. For instance, switch SW2 315 can be in an open position, preventing current from flowing from the PV array 210 to the inverter 230. In this situation, PV array 210 will generate an open-circuit voltage Voc.

At step 530, in anticipation of coupling or re-coupling PV array 210 to the inverter 230, the synchronized inverter 230 is connected to the AC grid 240 via switch SW1 354.

Once the inverter 230 is connected to the grid 240, the control system 402 is activated to adjust the DC link voltage $V_L$ from the first DC link voltage to a second DC link voltage as represented in step 540. The second DC link voltage is preferably the minimum voltage level (Vdc,min, e.g. 600V) that still allows control of the grid currents via the inverter 230.

In one embodiment, the control system 402 can temporarily lower the DC link voltage $V_L$ from the first DC link voltage to the second DC link voltage by overmodulating the inverter 230. Overmodulating the inverter 230 includes adjusting the gate timing commands of the inverter 230 so that the peak AC voltage of the AC output of inverter 230 is greater than the DC link voltage VL. In this condition, if power flow and AC output voltage of inverter 230 remains constant, the DC link voltage VL will be reduced from the first DC link voltage to the second DC link voltage.

In another embodiment, the control system can temporarily lower the DC link voltage by inputting reactive power into the inverter 230 from the AC grid. This will also induce a temporary reduction in DC link voltage VL from the first DC link voltage to the second DC link voltage. By reducing the DC link voltage $V_L$, the power converter system 500 will be ready to withstand any voltage surges caused during transient conditions when the PV array 210 is coupled to the converter 230.

The PV array 210 can then be coupled to the power converter system 500 to commence start up or after being decoupled from the power converter system 500 during a shut down condition or trip condition as represented in step 550. In a particular embodiment, PV array 210 can be coupled to converter system 500 by closing switch SW2 315. Subsequent to coupling the PV array 210 to converter system 500, control system 402 functions to quickly increase the power to the grid 240 in order to maintain a constant dc link voltage. By controlling the DC link voltage $V_L$ to be less than the open-circuit voltage Voc of the PV array 210, the PV array source voltage Vs is also maintained less than the open-circuit voltage Voc of the PV array 210, such as at the maximum power voltage for the PV array. In this manner, a power converter system 500 can accommodate a high open-circuit PV array 210 without having to use higher rated power electronic devices, such as higher rated IGBTs, in the power converter system 500.

Subsequent to the first/start-up transient, DC-DC converter 230 commences its normal MPP tracking control mode as represented in step 560. During this period of time, the reference DC link voltage increases to the nominal value (Vdc, nom, e.g. 750 V).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power inverter system, comprising:
    a DC power source;
    a DC to AC inverter configured to convert DC voltage from the DC power source to AC voltage;
    a DC link coupling the DC power source and the inverter, the DC link having a DC link voltage;
    an inverter pre-charger configured to pre-charge the inverter until the DC link voltage reaches a first DC link voltage prior to connecting the power inverter system to an AC power grid and the DC power source; and
    a phased lock loop configured to synchronize the pre-charged inverter to the AC power grid prior to connecting the power inverter system to the AC power grid, wherein the pre-charged inverter is further configured to decrease the DC link voltage to a second DC link voltage prior to connecting the DC power source to the power inverter system and subsequent to connecting the power inverter system to the AC power grid, wherein the second DC link voltage is a minimum voltage level required to control AC grid currents generated via the inverter and is less than a predetermined DC power source open circuit voltage, and further wherein the inverter is further configured to operate in a maximum power point tracking control mode subsequent to a first voltage transient caused by connecting the DC power source to the power inverter system.

2. The power inverter system according to claim 1, wherein the DC power source comprises a photovoltaic array.

3. The power inverter system according to claim 1, further comprising a DC to AC inverter control system, wherein the inverter is configured to regulate the DC link voltage in response to commands received via the inverter control system.

4. The power inverter system according to claim 3, wherein the control system is integral to the inverter.

5. The power inverter system according to claim 3, wherein the control system is external to the inverter.

6. The power inverter system according to claim 3, further comprising a DC to DC converter configured to boost the DC voltage generated via the DC power source.

7. The power inverter system according to claim 6, further comprising a DC to DC converter control system, wherein the DC to DC converter is configured to operate in the maximum power point tracking control mode subsequent to the first voltage transient and in response to commands received from the DC to DC converter control system.

8. The power inverter system according to claim 7, wherein the DC to DC converter control system is integral to the DC to DC converter.

9. The power inverter system according to claim 7, wherein the DC to DC converter control system is external to the DC to DC converter.

10. The power inverter system according to claim 7, wherein the DC to DC converter control system is integrated with the inverter control system.

11. The power inverter system according to claim 1, further comprising a switching mechanism configured to connect the power inverter system to the AC power grid.

12. The power inverter system according to claim 11, further comprising a switching mechanism configured to connect the power inverter system to the DC power source.

13. A method of operating a power inverter system, the method comprising:
    pre-charging a DC to AC inverter to until a DC link voltage reaches a first DC link voltage prior to connecting the power inverter system to an AC power grid and a DC power source, wherein the first DC link voltage is less than a predetermined DC power source open circuit voltage;
    synchronizing the resultant inverter output voltage to a predetermined AC power grid voltage via a phase-locked loop;
    connecting the synchronized inverter to the AC power grid;
    activating a DC link voltage control and decreasing the DC link voltage to a second DC link voltage prior to connecting the DC power source to the power inverter system and subsequent to connecting the synchronized inverter to the AC power grid wherein the second DC link voltage is a minimum voltage level required to control grid currents generated via the inverter and is less than the predetermined DC power source open circuit voltage; and
    connecting the DC power source to the power inverter system subsequent to activating the DC link voltage control and decreasing the DC link voltage to the minimum voltage level, such that the inverter adjusts power to the AC power grid to maintain a constant DC link voltage less than the predetermined DC power source open circuit voltage, and further such that the inverter commences maximum power point tracking control subsequent to a first voltage transient following connection of the DC power source to the power inverter system.

14. The method of operating a power inverter system according to claim 13, wherein decreasing the DC link voltage to the second DC link voltage comprises overmodulating the inverter.

15. The method of operating a power inverter system according to claim 13, wherein decreasing the DC link voltage to the second DC link voltage comprises inputting reactive power to the inverter from the AC power grid.

16. The method of operating a power inverter system according to claim 13, wherein connecting the DC power source to the power inverter system comprises closing a circuit breaker.

17. A method of operating a power inverter system, the method comprising:

pre-charging a DC to AC inverter until a DC link voltage reaches a first DC link voltage prior to connecting the power inverter system to an AC power grid and a DC power source, wherein the first DC link voltage is less than a predetermined DC power source open circuit voltage;

synchronizing the resultant inverter output voltage to a predetermined AC power grid voltage via a phase-locked loop;

connecting the synchronized inverter to the AC power grid;

activating a DC link voltage control and decreasing the DC link voltage to a second DC link voltage prior to connecting the DC power source to the power inverter system and subsequent to connecting the synchronized inverter to the AC power grid, wherein the second DC link voltage is a minimum voltage level required to control AC grid currents generated via the inverter and is less than the predetermined DC power source open circuit voltage;

connecting the DC power source to a DC-DC converter, wherein the DC-DC converter is connected to the synchronized inverter via a DC link; and regulating the DC-DC converter input voltage to the minimum voltage level, such that the converter commences maximum power point tracking control subsequent to a first voltage transient following connection of the DC power source to the power inverter system.

18. The method of operating a power inverter system according to claim 17, wherein decreasing the DC link voltage to the second DC link voltage comprises overmodulating the inverter.

19. The method of operating a power inverter system according to claim 17, wherein decreasing the DC link voltage to the second DC link voltage comprises inputting reactive power to the inverter from the AC power grid.

20. The method of operating a power inverter system according to claim 17, wherein connecting the DC power source to the power inverter system comprises closing a circuit breaker.

* * * * *

UNITED STATES PATENT AND TRADEMARK OFFICE
CERTIFICATE OF CORRECTION

PATENT NO. : 8,395,919 B2  Page 1 of 1
APPLICATION NO. : 12/845802
DATED : March 12, 2013
INVENTOR(S) : Schroeder et al.

It is certified that error appears in the above-identified patent and that said Letters Patent is hereby corrected as shown below:

In the Specification

In Column 7, Line 48, delete "324" and insert -- 320 --, therefor.

In Column 8, Line 22, delete "source 210" and insert -- source --, therefor.

In the Claims

In Column 10, Line 24, in Claim 13, delete "inverter to" and insert -- inverter --, therefor.

In Column 10, Line 38, in Claim 13, delete "grid" and insert -- grid, --, therefor.

Signed and Sealed this
Fourth Day of June, 2013

Teresa Stanek Rea
*Acting Director of the United States Patent and Trademark Office*